Aug. 11, 1964 R. E. MORRIS 3,144,162
CLOSURE FOR A PRESSURE VESSEL
Filed Aug. 14, 1961
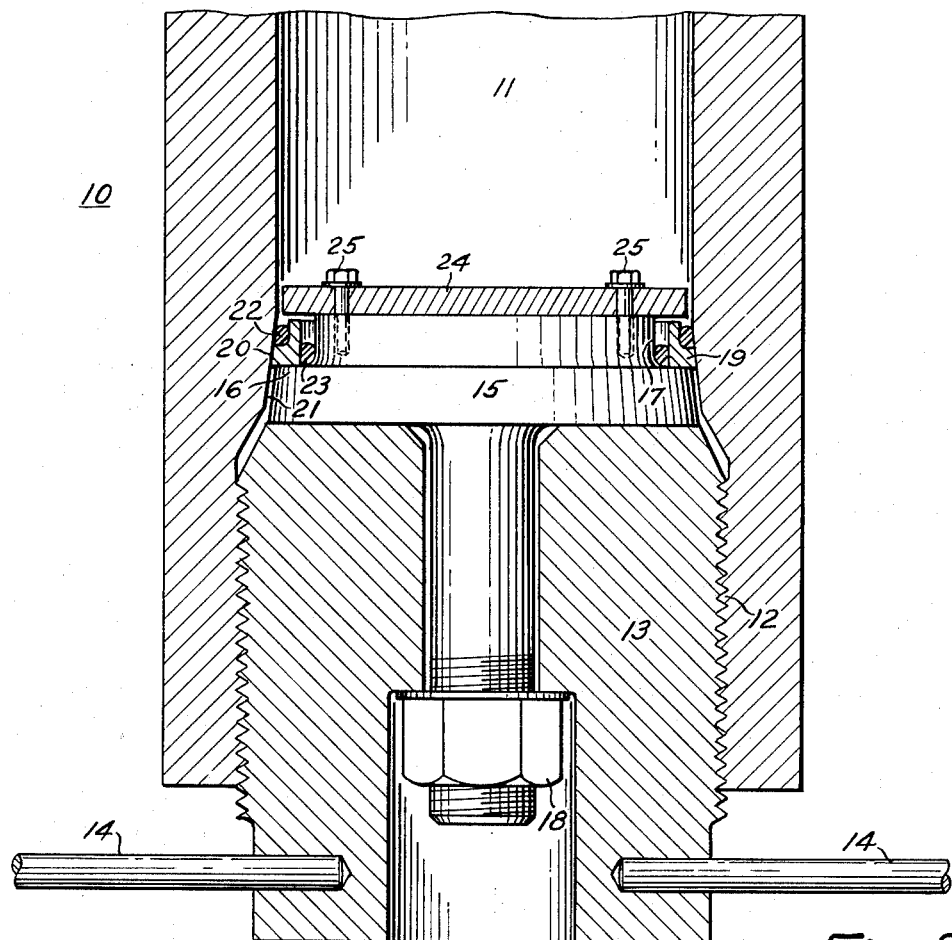
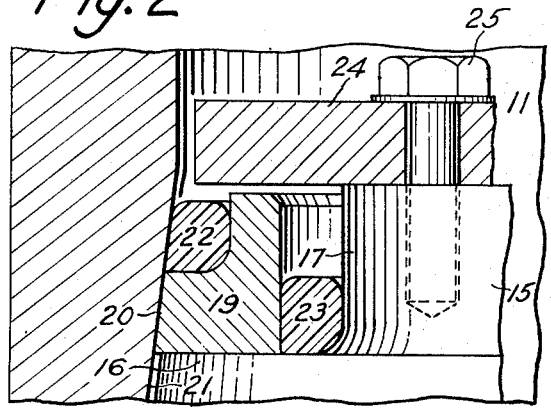
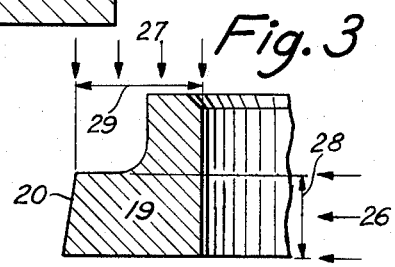
INVENTOR
Richard E. Morris
BY Natt M Emery Jr.
ATTORNEY United States Patent Office 3,144,162
Patented Aug. 11, 1964

3,144,162
CLOSURE FOR A PRESSURE VESSEL
Richard E. Morris, Bethlehem, Pa., assignor to Bethlehem Steel Company, a corporation of Pennsylvania
Filed Aug. 14, 1961, Ser. No. 131,199
8 Claims. (Cl. 220—46)

This invention relates generally to a closure for a pressure vessel and more particularly to a closure including an anti-extrusion ring for preventing extrusion or "blowout" of the sealing means in a high pressure vessel.

In the storing of fluids, conducting of chemical reactions, treating of materials or numerous other applications, it is sometimes necessary to provide a pressure vessel having a removable closure which can maintain a constant pressure in the vessel. When relatively low pressures are involved, a closure means including a sealing ring of yieldable or resilient material functions satisfactorily. However, when providing a closure for a vessel designed for a high pressure, the sealing ring of yieldable material has a tendency to be forced or extruded past the surfaces to be sealed. This invention overcomes this tendency by providing a closure member for a high pressure vessel comprising an anti-extrusion ring exposed to the pressure of the vessel and arranged on the closure member to prevent extrusion or "blowout" of the resilient sealing rings.

The object of this invention is to provide a closure for a high pressure vessel capable of maintaining a constant pressure.

Another object of this invention is to provide a closure for a vessel comprising resilient sealing rings and capable of withstanding high pressures.

Still other and further objects of this invention will be apparent from the specification and claims.

In the drawings:

FIG. 1 is a fragmental cross sectional view of the pressure vessel and closure means.

FIG. 2 is an enlarged fragmental cross sectional view of the sealing means.

FIG. 3 is an enlarged fragmental cross sectional view of the anti-extrusion ring.

With reference to the drawings, 10 indicates a pressure vessel having a pressure chamber 11. The pressure vessel is provided with a threaded opening 12 of a larger diameter than the pressure chamber 11 for the insertion of a threaded collar 13 having handles 14 attached thereto. Collar 13 positions and supports within the pressure vessel a plug member 15 having an inwardly extending shoulder 16 and a reduced diameter portion 17. Nut 18 in threaded engagement with the integral shank of plug member 15 holds plug member 15 relative to collar 13. While collar 13 and plug member 15 are shown as separate members, it is apparent that plug member 15 could be an integral part of collar 13. Seated on shoulder 16 is an anti-extrusion ring 19 having a tapered surface 20 in contact with a tapered seat 21 of the pressure vessel 10. The periphery of the anti-extrusion ring is provided with a recess for locating an O-ring 22 which is in contact with the anti-extrusion ring 19 and the tapered seat 21. A second O-ring 23 is in contact with the anti-extrusion ring 19, shoulder 16 and the reduced diameter portion 17. In order to efficiently support the O-rings, the surface of the anti-extrusion ring 19 in contact with O-ring 22 and the surface of reduced diameter portion 17 and shoulder 16 in contact with O-ring 23 are provided with suitable radii.

It is possible to utilize a sealing ring having a cross section other than that of an O-ring, in which case, the surface in contact with the sealing ring may be changed in order to offer proper support.

In order to position the anti-extrusion ring 19 relative to the plug member 15 and to aid in withdrawing the anti-extrusion ring 19 from contact with the tapered seat 21, a removable retainer plate 24 is secured to the face of plug member 15 by bolts 25. Retainer plate 24 has a diameter somewhat less than the diameter of the pressure chamber 11. Also, the depth of reduced diameter portion 17 is slightly greater than the depth of anti-extrusion ring 19. Thus, when the anti-extrusion ring 19 is properly seated against shoulder 16 and tapered seat 21, the retainer plate 24 does not prevent the internal pressure of the vessel from acting upon the anti-extrusion ring 19.

As shown, two O-rings 22, 23 are used in conjunction with an anti-extrusion ring 19 to provide a seal. O-ring 22 is placed in a recess formed by anti-extrusion ring 19 and the tapered seat 21, and O-ring 23 is placed in a recess formed by anti-extrusion ring 19, shoulder 16 and reduced diameter portion 17. The width of these recesses are slightly smaller than the free diameter of their respective O-rings in order to insure an initial seal prior to the application of pressure to vessel 10.

After the closure assembly has been positioned within the pressure vessel 10, pressure is admitted to chamber 11. Since the anti-extrusion ring 19 is exposed to this pressure, it is subjected to an effective force as indicated by arrows 26, 27 (FIG. 3). The radial force, indicated by the arrows 26, acts on the anti-extrusion ring 19 and maintains contact between the tapered surface 20 and the tapered seat 21. The axial force indicated by arrows 27, acts on the anti-extrusion ring 19 and maintains contact between the ring and shoulder 16. Thus, the pressure in the vessel maintains the anti-extrusion ring in contact with its mating surfaces and prevents extrusion or "blowout" of the O-rings. In providing an anti-extrusion ring of this design, it is important that the effective area of the ring exposed to the pressure of the vessel be sufficient to produce the desired force to maintain contact between the anti-extrusion ring and its mating surfaces. It has been determined that for a steel pressure vessel and a design pressure of approximately 100,000 p.s.i., a bronze anti-extrusion ring of 13 inches nominal diameter functions properly if the ring has an effective depth and width of approximately ½ inch. As shown in FIG. 3, the effective depth is indicated as 28 and the effective width as 29.

When subjected to a high pressure, the walls of the pressure vessel 10 tend to move radially outward and the collar 13 and the plug 15 tend to move substantially axially away from the region of high pressure, i.e. the pressure chamber 11. This axial movement of plug 15 causes the anti-extrusion ring to also move axially or away from the tapered seat 21. Thus in order to maintain contact between the tapered surface 20 of the anti-extrusion ring 19 and the tapered seat 21, the ring 19 must have a radial expansion greater than the radial expansion of the vessel 10. This relatively large radial expansion of the ring 19 would ordinarily cause high stresses in the ring 19. To compensate for this condition, the peripheral diameter of the ring is made slightly larger than the diameter of the tapered seat 21 at the initial position of the ring 19. Thus, the ring 19 prior to the application of pressure is subjected to a compressive load. This initial compressive load results in a lower tensile stress at the design pressure.

To further reduce the stress in the anti-extrusion ring 19, it is desirable to utilize a material having a relatively low modulus of elasticity. This low modulus of elasticity results in a lower stress for a given amount of deflection or expansion.

While the above description and drawings disclose an anti-extrusion ring 19 having a tapered surface 20 in contact with a tapered seat 21, it is possible to use a straight rather than tapered surfaces for the mating surfaces of the anti-extrusion ring and the seat of the pressure vessel. The other components of the closure member would remain substantially unaltered and the closure would function in substantially the same manner.

Although I have described my invention hereinabove in considerable detail, I do not wish to be limited narrowly to the exact and specific particulars disclosed, but I may also use such substitutes, modifications, or equivalents as are included within the scope and spirit of the invention or pointed out in the appended claims.

I claim:

1. Closure means for a pressure vessel having an opening therein provided with a seat therein, said means including:
   (a) a closure member extending into said opening,
   (b) an anti-extrusion ring having one side in contact with said closure member and the other side exposed to the pressure of said pressure vessel,
   (c) the outer face of said anti-extrusion ring being in contact with said seat and that part of the inner face of said anti-extrusion ring which is adjacent the closure member being exposed to the pressure of said pressure vessel,
   (d) a first sealing ring of yieldable material in contact with said seat and the side of said anti-extrusion ring exposed to the pressure of said pressure vessel, and
   (e) a second sealing ring exposed to the pressure of said pressure vessel and in contact with said closure member and said part of said inner face of said anti-extrusion ring.

2. Closure means as described in claim 1, wherein the sealing rings are of the O-ring type.

3. Closure means for a pressure vessel having an opening therein provided with a seat therein, said means including:
   (a) a closure member extending into said opening and having an inwardly extending shoulder thereon,
   (b) a portion of reduced diameter beyond said shoulder,
   (c) an anti-extrusion ring having one side in contact with said shoulder and the other side exposed to the pressure of said pressure vessel,
   (d) the outer face of said anti-extrusion ring being in contact with said seat and the inner face of said anti-extrusion ring being exposed to the pressure of said pressure vessel,
   (e) a first recess in said outer face of said anti-extrusion ring and exposed to the pressure of said pressure vessel,
   (f) a sealing ring of yieldable material in said first recess,
   (g) a second recess exposed to the pressure of said pressure vessel and formed by said inner face of said anti-extrusion ring, said shoulder, and said reduced diameter portion, and
   (h) a sealing ring of yieldable material in said second recess.

4. Closure means as described in claim 3 wherein the sealing rings are of the O-ring type.

5. Closure means as described in claim 3 wherein the seat of the pressure vessel is tapered.

6. Closure means for a pressure vessel having an opening therein provided with a tapered seat therein and comprising:
   (a) a closure member extending into said opening and having an inwardly extending shoulder thereon,
   (b) a portion of reduced diameter beyond said shoulder,
   (c) an anti-extrusion ring having one side in contact with said shoulder and the other side exposed to the pressure of said pressure vessel,
   (d) the outer face of said anti-extrusion ring being in contact with said tapered seat and the inner face being exposed to the pressure of said pressure vessel,
   (e) said outer face of said anti-extrusion ring having a greater diameter than the diameter of said tapered seat whereby said anti-extrusion ring is subjected to an initial compressive load,
   (f) a first O-ring exposed to the pressure of said pressure vessel and positioned in a recess formed in said outer face of said anti-extrusion ring, and
   (g) a second O-ring exposed to the pressure of said pressure vessel and positioned in the recess formed by said inner face of said anti-extrusion ring, said shoulder, and said reduced diameter portion.

7. Closure means for a pressure vessel having an opening therein provided with a tapered seat therein and comprising:
   (a) a closure member extending into said opening and having an inwardly extending shoulder and a reduced diameter portion beyond said shoulder,
   (b) an anti-extrusion ring having one side in contact with said shoulder and the other side exposed to the pressure of said pressure vessel,
   (c) the outer face of said anti-extrusion ring being in contact with said tapered seat and the inner face being exposed to the pressure of said pressure vessel,
   (d) said outer face of said anti-extrusion ring having a greater diameter than the diameter of said tapered seat whereby said anti-extrusion ring is subjected to an initial compressive load,
   (e) a first recess in said outer face of said anti-extrusion ring and exposed to the pressure of said pressure vessel,
   (f) an O-ring in said first recess,
   (g) a second recess formed by said inner face of said anti-extrusion ring, said shoulder, and said reduced diameter portion, and
   (h) an O-ring in said second recess.

8. Closure means for a pressure vessel having an opening therein provided with a seat therein and comprising:
   (a) a closure member extending into said opening and having an inwardly extending shoulder and a reduced diameter portion beyond said shoulder,
   (b) an anti-extrusion ring of substantially L-shape cross section,
   (c) one leg of said substantially L-shape cross section in contact with said shoulder and said seat,
   (d) the other leg forming the inner face of said anti-extrusion ring and spaced from said reduced diameter portion,
   (e) a first sealing ring positioned in the pressure exposed recess formed by said legs and said seat, and
   (f) a second sealing ring positioned in the pressure exposed recess formed by said inner face, said reduced diameter portion, and said shoulder.

References Cited in the file of this patent

UNITED STATES PATENTS

| | | |
|---|---|---|
| 2,001,458 | Dunn | May 14, 1935 |
| 2,016,226 | Clausen | Oct. 1, 1935 |
| 2,462,493 | Hamer | Feb. 22, 1949 |
| 2,873,043 | Folmsbee | Feb. 10, 1959 |